US007953815B2

(12) United States Patent
Kaufman et al.

(10) Patent No.: US 7,953,815 B2
(45) Date of Patent: *May 31, 2011

(54) COOPERATIVE LOCATION BASED TASKS

(75) Inventors: James H. Kaufman, San Jose, CA (US); Reiner Kraft, Gilroy, CA (US); Joann Ruvolo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 318 days.

This patent is subject to a terminal disclaimer.

(21) Appl. No.: 12/138,602

(22) Filed: Jun. 13, 2008

(65) Prior Publication Data

US 2009/0006576 A1   Jan. 1, 2009

Related U.S. Application Data

(63) Continuation of application No. 09/794,484, filed on Feb. 26, 2001, now Pat. No. 7,409,429.

(51) Int. Cl.
*G06F 15/16* (2006.01)
*G01C 21/00* (2006.01)
*H04W 24/00* (2009.01)

(52) U.S. Cl. ...... 709/207; 701/207; 701/213; 455/456.3

(58) Field of Classification Search ............... 709/203, 709/207; 455/456.1, 456.3, 414.2; 701/207
See application file for complete search history.

(56) References Cited

U.S. PATENT DOCUMENTS

| | | | | |
|---|---|---|---|---|
| 5,014,206 A * | 5/1991 | Scribner et al. | | 701/207 |
| 5,311,424 A * | 5/1994 | Mukherjee et al. | | 705/29 |
| 5,636,122 A * | 6/1997 | Shah et al. | | 701/207 |
| 5,738,721 A * | 4/1998 | Barron et al. | | 117/104 |
| 5,742,509 A | 4/1998 | Goldberg et al. | | 701/211 |
| 5,884,216 A * | 3/1999 | Shah et al. | | 701/207 |
| 5,938,721 A * | 8/1999 | Dussell et al. | | 701/211 |
| 6,177,905 B1 * | 1/2001 | Welch | | 342/357.13 |
| 6,226,622 B1 * | 5/2001 | Dabbiere | | 705/28 |
| 6,240,362 B1 * | 5/2001 | Gaspard, II | | 701/209 |
| 6,317,718 B1 * | 11/2001 | Fano | | 705/14.39 |
| 6,327,570 B1 * | 12/2001 | Stevens | | 705/7 |
| 6,363,320 B1 * | 3/2002 | Chou | | 701/207 |
| 6,484,148 B1 * | 11/2002 | Boyd | | 705/14.64 |
| 6,510,381 B2 * | 1/2003 | Grounds et al. | | 701/207 |
| 6,639,516 B1 * | 10/2003 | Copley | | 340/573.4 |

(Continued)

FOREIGN PATENT DOCUMENTS

EP   1008946 A1 *  6/2000

OTHER PUBLICATIONS

Abowd, George D. "Software Engineering Issues for Ubiquitous Computing", ICSE '99, Los Angeles, CA, pp. 75-84.

(Continued)

*Primary Examiner* — Aaron Strange
(74) *Attorney, Agent, or Firm* — Jon A. Gibbons; Fleit Gibbons Gutman Bongini & Bianco PL

(57) ABSTRACT

A method for providing location dependent information to a user for selective colleague assistance. The method on a Client Wireless Component includes the steps of receiving location data from a plurality of Global Positioning System GPS satellites and transmitting the location data to an Active Calendar Component. The method further includes on an Active Calendar Component the steps of receiving Client Wireless Component location data and determining if within a threshold distance a Colleague item list exists for user completion.

13 Claims, 10 Drawing Sheets

U.S. PATENT DOCUMENTS

| | | | |
|---|---|---|---|
| 6,654,726 B1 * | 11/2003 | Hanzek | 705/26 |
| 6,680,675 B1 * | 1/2004 | Suzuki | 340/988 |
| 6,728,685 B1 * | 4/2004 | Ahluwalia | 705/26 |
| 6,842,877 B2 * | 1/2005 | Robarts et al. | 715/708 |
| 2002/0072960 A1 * | 6/2002 | Dabbiere | 705/11 |
| 2002/0099583 A1 * | 7/2002 | Matusek et al. | 705/7 |
| 2003/0041023 A1 * | 2/2003 | Goldstein et al. | 705/39 |

OTHER PUBLICATIONS

Abowd, et al. "Cyberguide: A Mobile Context-aware Tour Guide", Wireless Networks 3 (1997) pp. 421-433.

Huang et al. "Pervasive Computing: What is it Good for?", MobiDE, Seattle, WA, 1999, pp. 84-91.

* cited by examiner

COOPERATIVE LOCATION BASED TASKS

CROSS-REFERENCE TO RELATED APPLICATIONS

This application is a continuation of and claims priority from U.S. patent application Ser. No. 09/794,484, filed on Feb. 26, 2001, now U.S. Pat. No. 7,409,429, the entire disclosure of which is herein incorporated by reference in its entirety.

BACKGROUND OF THE INVENTION

1. Field of the Invention

The invention relates to improvements in the dissemination of useful information. More particularly, the invention is an improved method and system for providing relevant information at a communication point.

2. The Prior Art

Individual and group scheduling applications are known in the prior art. Such scheduling applications display a person's schedule, indicating free and busy times. The schedules of several people may be compared and the common free times displayed. A meeting may therefore be scheduled at a time when all persons can attend.

In many enterprises, organizations, and work groups, members of the aforementioned are responsible for completion of identical or nearly identical tasks. These organizations seek to reduce infrastructure cost by eliminating central support organizations and passing identical tasks down to the individual employee. However, a problem arises in that the dissemination of identical tasks to a plurality of employees leads to a redundancy in effort and a concomitant loss in worker efficiency. As such, there presently exists no tools with which to assist individuals to overcome this problem. Hence, a need exists for a solution to the aforementioned problem. The instant invention satisfies such a need. Further, in addition to the aforementioned, there are several location determining architectures that are well known in the art.

In particular, there exists location tracking architectures available with Wireless Local Area Network or WLAN, Global Positioning System or GPS, badge reader tracking or Radio Frequency Identification tags tracking and generic location tracking devices. First, in the simplest of terms, WLAN is local area networking without wires, providing all the features and benefits of traditional LAN technologies like Ethernet in addition to location tracking. The location tracking used in WLAN includes both determining a location based upon the nearest cell and determining a location based upon a triangulation of the transmission source. Instead of using twisted pair wire, coaxial cable or fiber optics, wireless LANs use radio frequencies to send and transmit data between PCs or other network devices without wires or cables. Wireless LANs "talk" on spread spectrum radio waves which are less susceptible to radio noise and interference and therefore ideal for data communications. There are two types of spread spectrum: direct sequence and frequency hopping. Direct sequence is the only one that supports 11 Megabits per second (Mbps) Ethernet-like speeds.

Second, Global Positioning System (GPS) receivers normally determine their position by computing relative times of arrival of signals transmitted simultaneously from a multiplicity of GPS (or NAVSTAR) satellites. These satellites transmit, as part of their message, both satellite positioning data as well as data on clock timing, so called "ephemeris" data. The GPS location process comprises the searching for and acquiring of GPS signals, reading the ephemeris data for a multiplicity of satellites and computing the location of the receiver from this data. There are two principal functions of GPS receiving systems: (1) computation of the pseudoranges to the various GPS satellites, and (2) computation of the position of the receiving platform using these pseudoranges, satellite timing and ephemeris data. The pseudoranges are simply the time delays measured between the received signal from each satellite and a local clock. The satellite ephemeris and timing data is extracted from the GPS signal once it is acquired and tracked.

Finally, badge reader tracking or Radio Frequency Identification tags tracking, as well as generic location tracking devices are well known in the art and serve today in a variety of fields.

SUMMARY OF THE INVENTION

A method for providing location dependent information to a user for selective colleague assistance. The method on a Client Wireless Component includes the steps of receiving location data from a plurality of Global Positioning System GPS satellites and transmitting the location data to an Active Calendar Component. In another embodiment, the method further includes on an Active Calendar Component the steps of receiving Client Wireless Component location data and determining if within a threshold distance a Colleague item list exists for user completion.

BRIEF DESCRIPTION OF THE FIGURES

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE PREFERRED EMBODIMENTS

Figure 1:
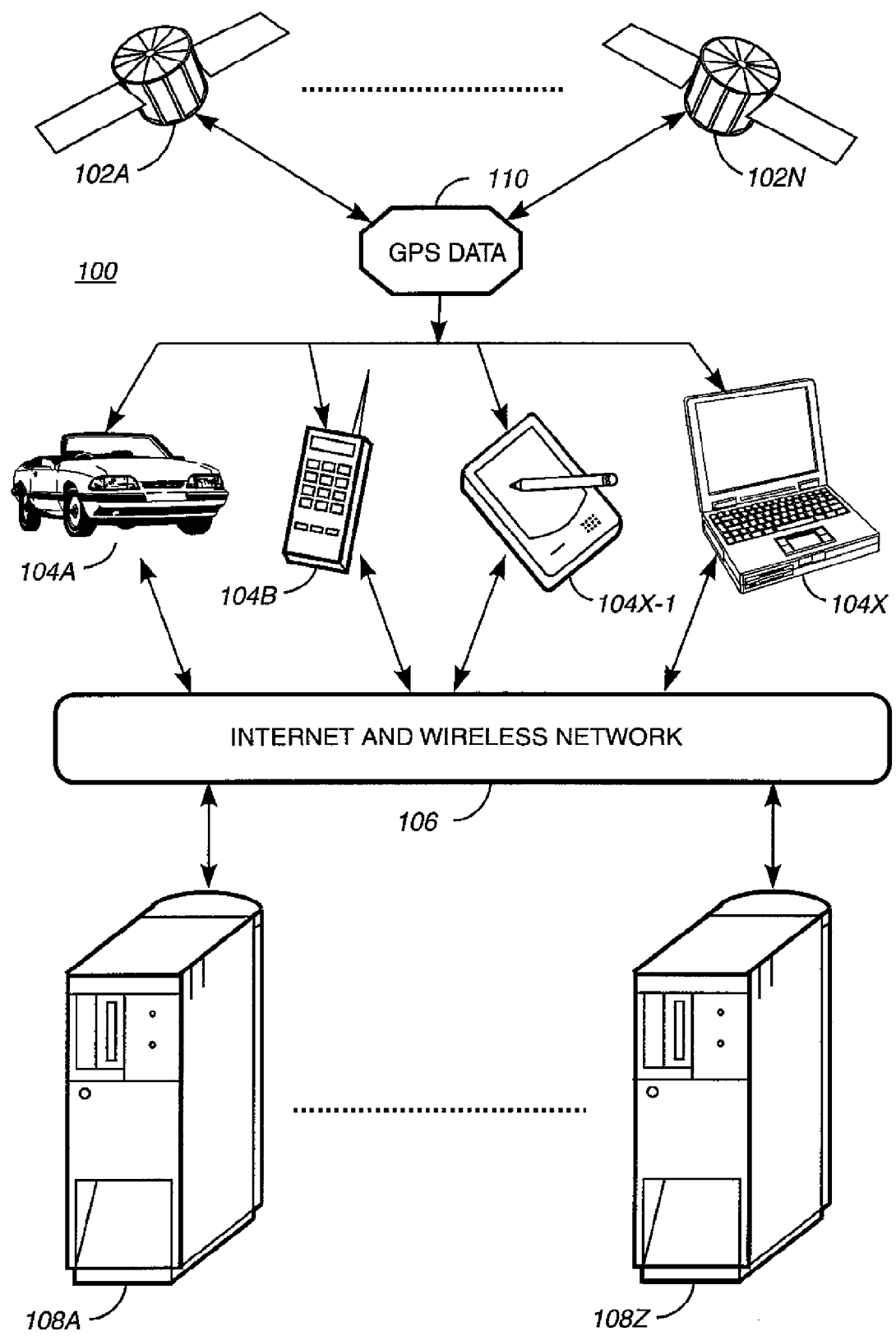
FIG. 1 comprises a high level overview of an Event Alert System as practiced by the invention.

It is important to note that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

In the drawing like numerals refer to like parts through several views.

Exemplary Embodiment

FIG. 1 comprises a high level overview of an Event Alert System (100) comprising several main components including the two groups of main components including a plurality of Active Calendar Components (108a to 108z) and GPS Client Wireless Components (104a to 104x). GPS data (110) is transmitted from satellites (102a to 102n) to Client Wireless Components (104a to 104x). The Client Wireless Components (104a to 104x) use the GPS data (110) to determine their present location. Then, in conjunction with Active Calendar Components (108a to 108z) the Client Wireless Components (104a to 104x) are informed of "To do list" actions that facilitate the function of the enterprise, organization or work group. The notification of the "To do list" is accomplished via communication with the Active Calendar Components (108a to 108z) across the Internet or a Wireless Network (106).

GPS Client Wireless Component

Figure 2:
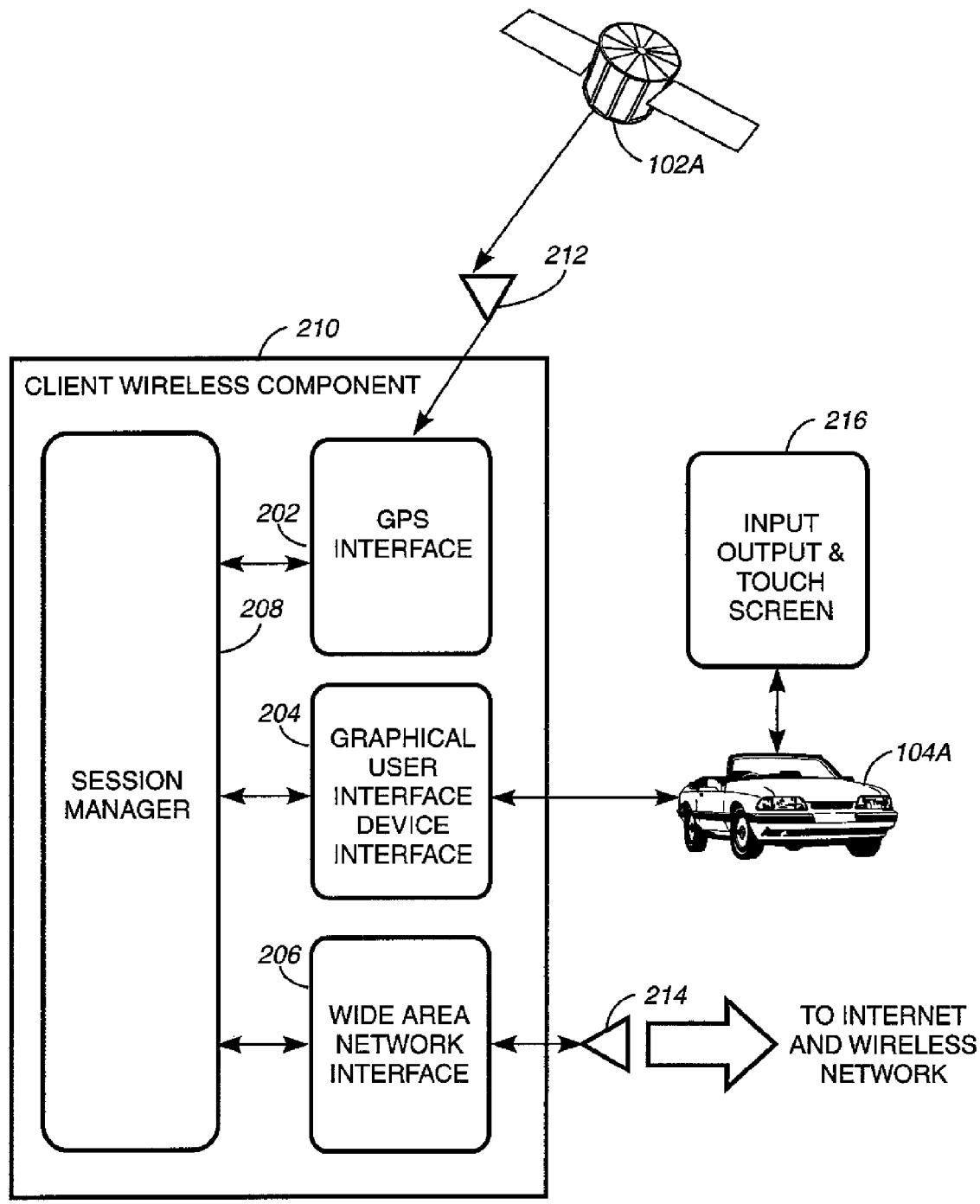
FIG. 2 comprises a block diagram of a Client Wireless Component as found in the invention.

FIG. 2 comprises a block diagram (200) of a GPS Client Wireless Component (210) as found in the invention. The Client Wireless Component (210) is in FIG. 2 integrated into an automobile (104a), however, other implementations are possible. These other implementations include but are not limited to an automobile (104a), a wireless telephone (104b), a personal digital assistant (104x-1) and a portable computer (104x) as well as a generic wireless device with a processing unit. Further, the Client Wireless Component (210) includes a Touch Screen (216) graphical user interface. A user may interact with the Touch Screen (216) so as to activate the Event Alert System (100). The Client Wireless Component (210) comprises seven objects or modules. Namely, a GPS Interface (202), a Graphical User Interface (204), a Wide Area Network Interface (206), a Session Manager (208), a GPS Antenna (212) and a Wide Area Network Transceiver Antenna (214). The Wide Area Network Antenna (214) comprises a connection for communicating with Active Calendar Components (108a to 108z) or other servers not shown in FIG. 1 or FIG. 2.

Figure 7:
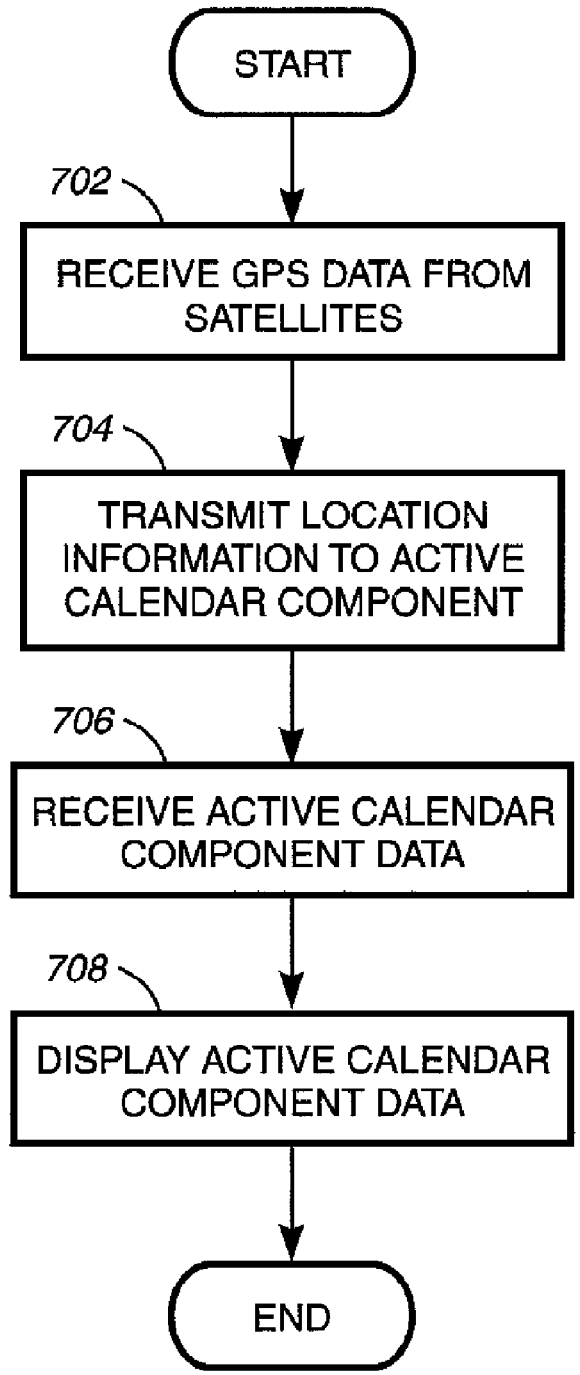
FIG. 7 comprises a flowchart illustrating the functionality of the Client Wireless Component as practiced by this invention.

FIG. 7 comprises a flowchart (700) illustrating the functionality of the Client Wireless Component as practiced by this invention. Tasks of the Client Wireless Component (210) include determining the present location of the current user from GPS data (702) as well as forwarding (704) the location information to the Active Calendar Components (108a to 108z). In addition, the Client Wireless Component (210) receives data (706) from the Active calendar (108a to 108z) and displays (708) it for the user on a display device, for example Touch Screen (216).

Global Positioning System (102a)

PS (102a) is the existing GPS satellite system. While the description below is for the GPS system, the invention envisions the use of other location tracking systems including but not limited to cell location or WLAN tracking, Radio Frequency RF badge tracking and other generic location tracking systems. Note that only one satellite is shown in FIG. 2, although a plurality are needed to accurately compute the location data. GPS technology is utilized in the invention for location tracking. The satellites transmit location tracking information to a Client Wireless Component (210) which receives it via GPS Antenna (212) through GPS Interface (202). The GPS Interface (202) determines a current location of the GPS client wireless component (210) and supplies the current location to the session manager (208). Global Positioning System (GPS) receivers normally determine their position by computing relative times of arrival of signals transmitted simultaneously from a multiplicity of GPS (or NAVSTAR) satellites. These satellites transmit, as part of their message, both satellite positioning data as well as data on clock timing, so called "ephemeris" data. The GPS location process comprises the searching for and acquiring of GPS signals, reading the ephemeris data for a multiplicity of satellites and computing the location of the receiver from this data. There are two principal functions of GPS receiving systems: (1) computation of the pseudo-ranges to the various GPS satellites, and (2) computation of the position of the receiving platform using these pseudo-ranges, satellite timing and ephemeris data. The pseudo-ranges are simply the time delays measured between the received signal from each satellite and a local clock. The satellite ephemeris and timing data is extracted from the GPS signal once it is acquired and tracked.

Global Positioning System Antenna (212)

A GPS Antenna or location determining antenna (212) connects to the GPS interface (202) to receive GPS data or generic location determining data from the GPS satellite system or generic location determining source.

Session Manager (208)

The GPS Client Wireless Component (210) operates under the control of a Session Manager (208). The session manager (208) is responsible for the interaction between the sub components of the Client Wireless Component (210). The Session Manager (208) prepares incoming data, such as location, calendar entries and other useful information for further processing. The processing includes but is not limited to transmission to the Active Calendar System (108a to 108z) over the Wide Area Network interface (206), or displaying the data over the Graphical User Interface Device Interface (204) on a Touch Screen (216).

Wide Area Network Interface (206)

The Wide Area Network Interface (206) supports a wireless connection to the Internet or other communication network. With this interface the GPS client wireless component (210) can always be connected to the Active Calendar System (108a to 108z).

Graphical User Interface Device Interface (204)

The Graphic User Interface (204) is implemented in a GPS Client Wireless Component (210) for an easily configurable and useable entry system.

Wide Area Network Transceiver Antenna (214)

The Wide Area Network Transceiver Antenna (214) is for the wireless connection to the Internet or another network. The Antenna (214) is connected to the Wide Area Network Interface (206) of the GPS Client Wireless Component (210).

Input and Output Device (216)

The Input and Output Device (216) may be implemented as a display as well as a touch screen. The Touch Screen is used for manual user inputs and configuration of the system. The display is for output of messages from the system to a user.

Active Calendar Component (300)

Figure 3:
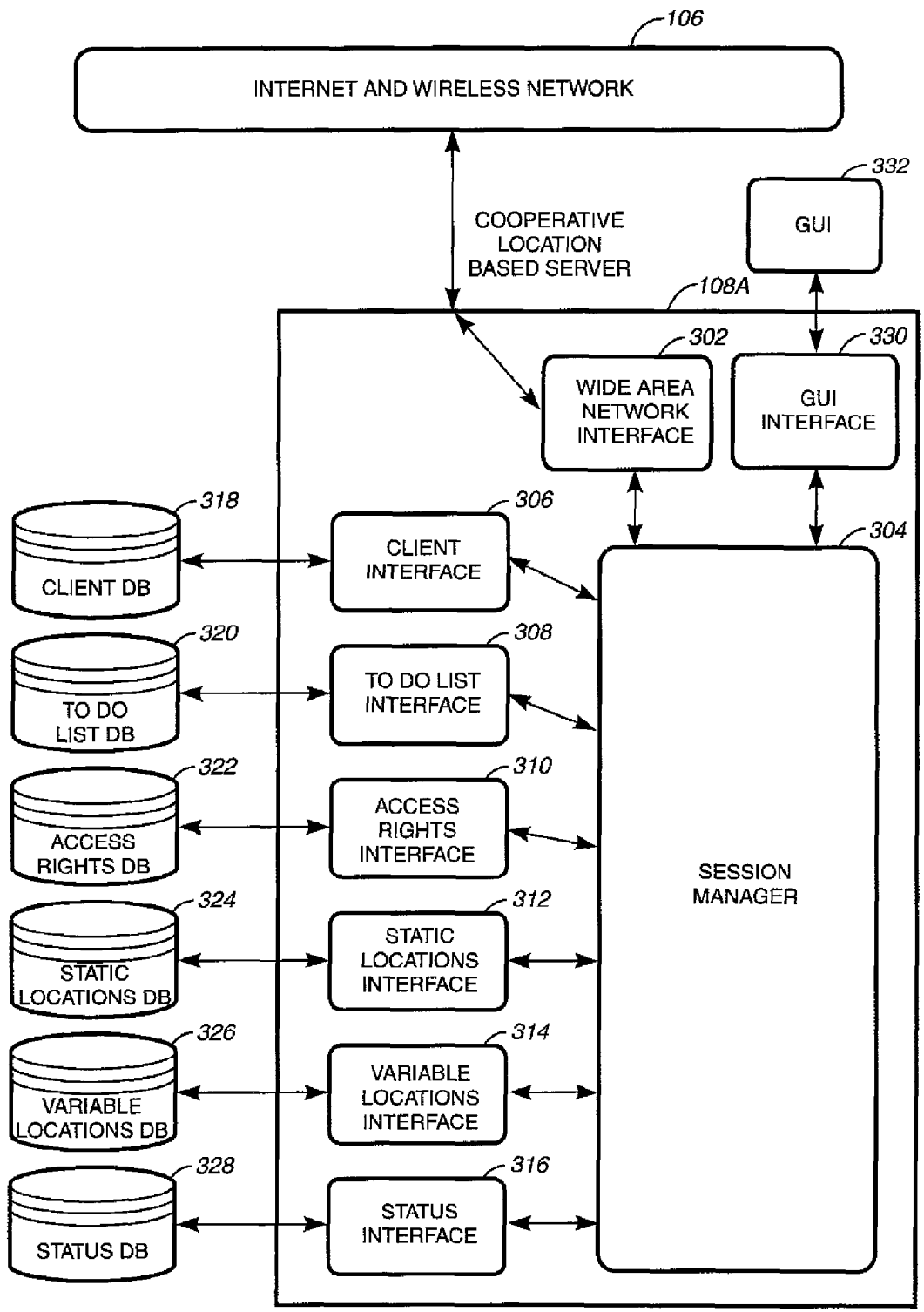
FIG. 3 comprises an Active Calendar Component comprising a server and a set of databases.

FIG. 3 comprises an Active Calendar Component (300) comprising a Cooperative Location Based Server (108a) and a set of databases or data structures comprising the databases or data structures of: Client (318), To Do List (320), Access Rights (322), Static Locations (324), Variable Locations (326) and Status (328). More generally, the invention comprises a server with associated databases or data structures providing location dependent information to a user. For the purposes of the discussion, the server is known as a Cooperative Location Based Server (108a) and the server combined with the location dependent data structures or databases as an Active Calendar Component (300). The Cooperative Location Based Server (108a) further comprises the following sub-components of a Session Manager (304), a Wide Area Network Interface (302) and a plurality of interfaces comprising the interfaces of: Client (306), To Do List (308), Access Rights (310), Static Locations (312), Variable Locations (314) and Status (316). The Active Calendar Component (300) is an electronic active calendaring system. It may be a web based component. One of the features of the Active Calendar Component (300) is that it automatically executes tasks. In this case, the Active Calendar Component (300) automatically sends events of a specific location to a user, whenever the user is close to that location.

Session Manager (304)

The Session Manager (304) is responsible for the communication and interaction between the internal components of the Active Calendar (300). Furthermore the Session Manager (304) periodically measures the distance between users and specific locations, which are defined and stored in a database.

GUI Device Interface (330) and GUI (332)

A Graphical User Interface Device Interface (330) drives a display and accepts user inputs from a keyboard to implement a GUI (332). A GUI (332) enables a comfortable and facile means for system administrators to configure the system locally. For instance, to set up a particular calendar entry or a threshold distance by which a user proximity to a given trigger point can be determined.

Client Interface (306) and Database (318)

A Client Interface (306) contains the methods used by the Session Manager to access and modify the Client database. A Client Database (318) contains information about the clients on the system.

To Do List Interface (308) Database (320)

A ToDoList Interface (308) contains the methods used by the Session Manager to access and modify the ToDoList database (320). The ToDoList database (320) contains information about the clients To Do Lists.

Access Rights Interface (310) Database (322)

An Access Rights Interface (310) contains the methods used by the Session Manager (304) to access and modify the Access Rights Database (322). The Access Rights Database (322) contains information about the access rights on the system.

Static Locations Interface (312) Database (324)

A Static Locations Interface (312) contains the methods used by the Session Manager (304) to access and modify the Static Locations Database (324). The Static Locations Database (324) contains information about the location of important static locations such as stock rooms, stores, libraries, buildings, and other destinations where the client might seek to list items or information.

Variable Locations Interface (314) Database (326)

A Variable Locations Interface (314) contains the methods used by the Session Manager (304) to access and modify the Variable Locations Database (326). The Variable Locations Database (326) contains information about the current location of important clients and other mobile entities (cars, airplanes or the equivalent). The session manager (304) accesses this database, for example, to determine if a colleague of the client whose location is variable is currently in his/her office, a Static Location.

Status Interface (316) and Database (328)

A Status Interface (316) contains the methods used by the Session Manager (304) to access and modify the Status Database (328). The Status Database (328) contains information about the status of the system and availability of system resources.

Functional Overview—Shopping List

When the distance between the user or object and an event location is less than some threshold distance, then the execution of a program specific to that user and that location is initiated. The threshold distance that triggers the execution can be predetermined or computed dynamically from a variety of inputs. These inputs include but are not limited to the specific user or object, their current speed, their direction of travel, the time of day, and other factors such as the weather.

Further, the invention generalizes the concept of a "Calendar", a "To do list", and other "organizer" data objects to enable and facilitate cooperative location based tasks. An Active Calendar (300) anticipates a users needs. To anticipate a users needs, the Active Calendar (300) uses spatial information. For example, the Active Calendar (300) informs a user that a person with whom the user wishes to speak is in close proximity. The Active Calendar (300) as described in the invention, illustrates how 'Calendar' and 'To Do List' objects can be generalized to enable cooperative behavior.

Figure 4:
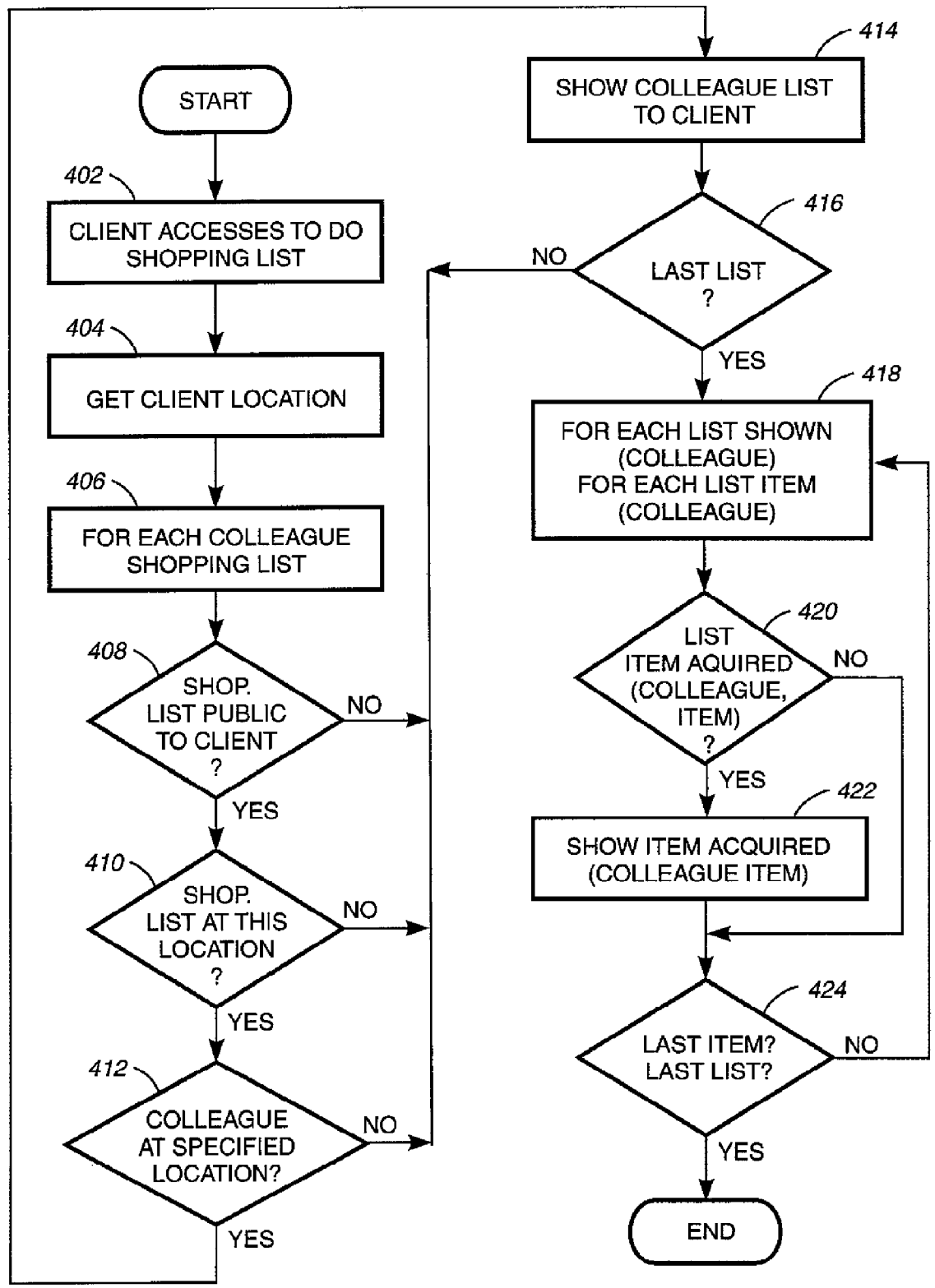
FIG. 4 comprises a flowchart illustrating the steps of the Active Calendar System as applied to a shopping list.

FIG. 4 comprises a flowchart (400) illustrating the steps of the Active Calendar System as applied to a shopping list. Consider, for example a "To Do List" object such as a "Shopping List" which is accessed by a user (402). One can designate that such an object can be public to a select group of other users. This group can be context sensitive. For instance, an "Almaden Stockroom" shopping list may be public to others in a user's work group whereas a "Supermarket Shopping List" may be public only to family members.

Using some appropriate middle-ware with location enabled information, the Active Calendar Component (300) determines a user's location (404) and, for example, the location of a users office. This location may refer to a physical location, an electronic location, a symbolic location, a URL, an ID or identification, an account, a telephone number or the equivalent. If the user is at the Almaden Stockroom and accesses his/her "Almaden Stockroom Shopping List", the system checks for other public objects of type "Almaden Stockroom Shopping List" owned by the user's peers or colleagues (406) whose office location is close to the users office location. Then the system determines if such lists exist which are public to a user (408), at the same location as the user location (410) and optionally if the peers are at a specified location (412). This location may refer to a physical location, an electronic location, a symbolic location, a URL, an ID or identification, an account, a telephone number or the equivalent. As a result, the system can either display their shopping list on a portable, location aware, connected device, or display an icon indicating it has discovered one or more peer list(s) (414). Next, a determination is made (416) as to whether or not this is the last list available for the particular location and shopping list type. If it is not the last list then the process loops to step (406). If it is the last list, then the process enters a loop so that for each list and item shown (418) a user may then chose (420) to either select the icon and pick up items needed by his/her peer (422) or to disregard the peer's needs by bypassing the selection step. Finally, a determination is made as to whether or not the previous item was the last item on the last list (424). If not, the process continues with step (418). If so, then the process terminates. When a user picks up an item that fact can be entered into the shopping list database so that the peer or colleague knows that the items have been acquired and by whom. Alternatively, a To Do List data structure or database contains the items to be acquired or accomplished and another database maintains the records of items already acquired, accomplished, or removed by user request from the To Do List data structure or database. When the item is acquired, accomplished or requested for removal by a user, then the item is removed from the To Do List database or data structure and the fact of its removal is registered in another database or data structure.

This type of cooperative or collaborative behavior applies not only to objects such as shopping lists but is generalized to other "To Do List" objects or even calendar objects. If a user designates that an object is public to a predetermined group, others can access the object to assist a peer to obtain physical goods or information. For instance, a manager who needs to ask a question to Human Resource about salary plan parameters may chose to make that question known to peers who might either know the answer or be able to obtain the answer during a different visit to Human Resources. The Active Calendar Component (300) identifies these objects as public with a collaborative Boolean variable set true.

The invention as described further comprises the following additional unique characteristics. Namely, the invention allows members of a group to assist each other. Today, that is not automatically available in calendars and to do lists. By notifying a user that he or she can help a colleague with a minimum of effort this tool facilitates cooperation and collaboration. This notification is effected because the system knows that the user is in a particular location already and that the colleague is at his/her desk. Since it is context programmable, the users can determine, for example, that work colleagues have access to some information but not other information thus protecting privacy and confidentiality.

Another Embodiment

Discussion List for a Meeting

Figure 5:
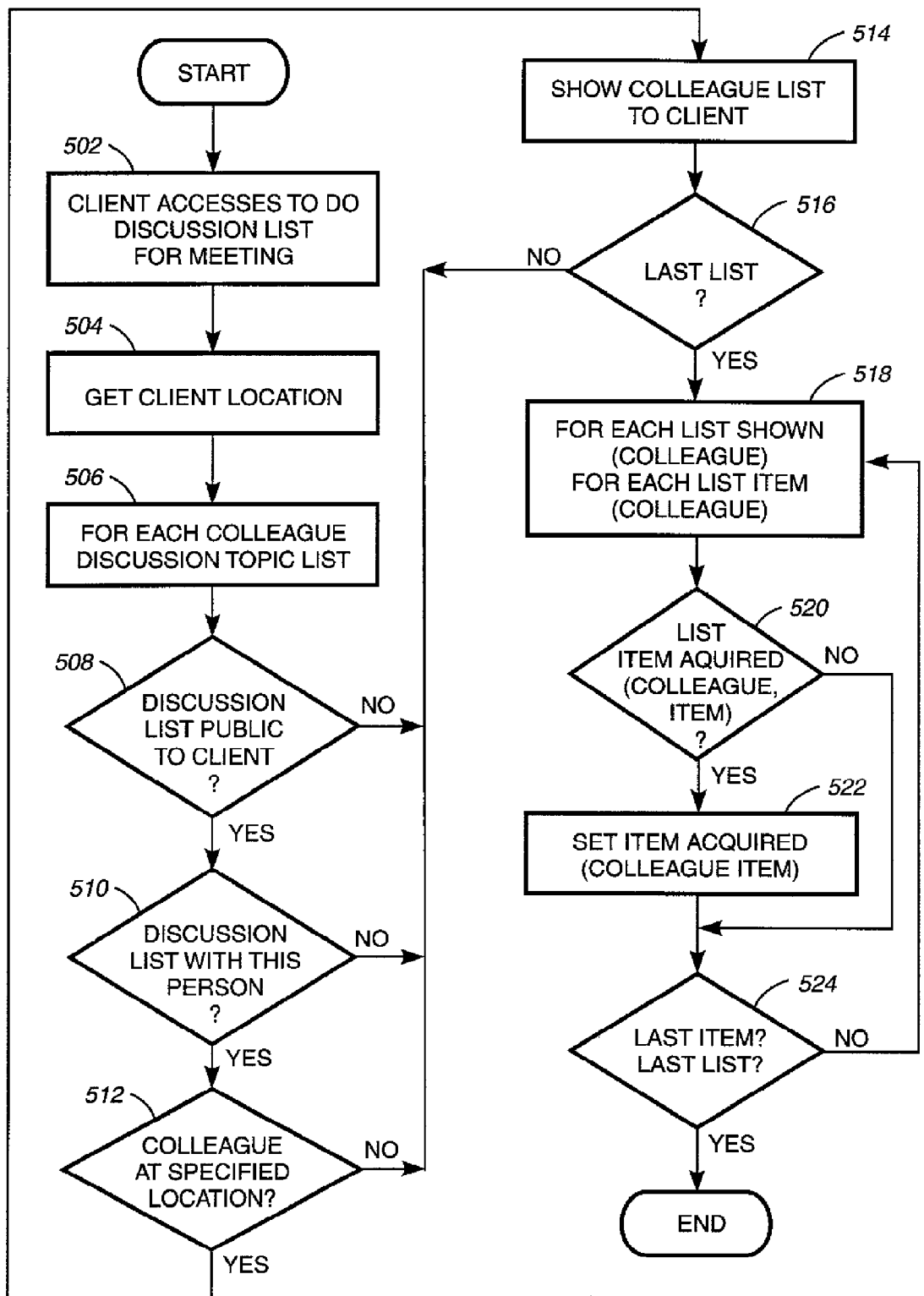
FIG. 5 comprises a flowchart illustrating the steps of the Active Calendar System as applied to a discussion list for a meeting.

FIG. 5 comprises a flowchart illustrating the steps of the Active Calendar system as applied to a discussion list for a meeting. Consider, for example a "To Do List" object such as a "Discussion List" for a meeting which is accessed by a user (502). One can designate that such an object can be public to a select group of other users. This group can be context sensitive. For instance, an "Almaden Monthly Inventors" meeting list may be public to others in a user's work group whereas a "Almaden Financial Backing List" may be public only to members of the Almaden accounting department.

Using some appropriate middle-ware with location enabled information, the Active Calendar Component (300) determines a user's location (504) and, for example, the location of a users office. This location may refer to a physical location, an electronic location, a symbolic location, a URL, an ID or identification, an account, a telephone number or the equivalent. If the user is at the Almaden Monthly Inventor's meeting and accesses his/her "Almaden Monthly Inventors List", the system checks for other public objects of type "Almaden Monthly Inventors List" owned by the user's peers or colleagues (506) whose office location is close to the users office location. Then the system determines if such lists exist which are public to a user (508), at the same location as the user location (510) and optionally if the peers are at a specified location (512). This location may refer to a physical location, an electronic location, a symbolic location, a URL, an ID or identification, an account, a telephone number or the equivalent. As a result, the system can either display their Monthly Inventors list on a portable, location aware, connected device, or display an icon indicating it has discovered one or more peer list(s) (514). Next, a determination is made (516) as to whether or not this is the last list available for the particular location and Monthly Inventors discussion list type. If it is not the last list then the process loops to step (506). Otherwise, the process enters a loop so that for each list and item shown (518) a user may then chose (520) to either select the icon and pick up items needed by his/her peer (522) or to disregard the peer's needs by bypassing the selection step. Finally, a determination is made as to whether or not a the previous item was the last item on the last list (524). If not the process continues with step (518). If so, then the process terminates. When a user picks up an item or learns the answer to a question in a discussion, that fact can be entered into the Monthly Inventors list database so that the peer or colleague knows that the items have been acquired and by whom.

Another Embodiment

Telephonic Meeting Discussion List

Figure 6:
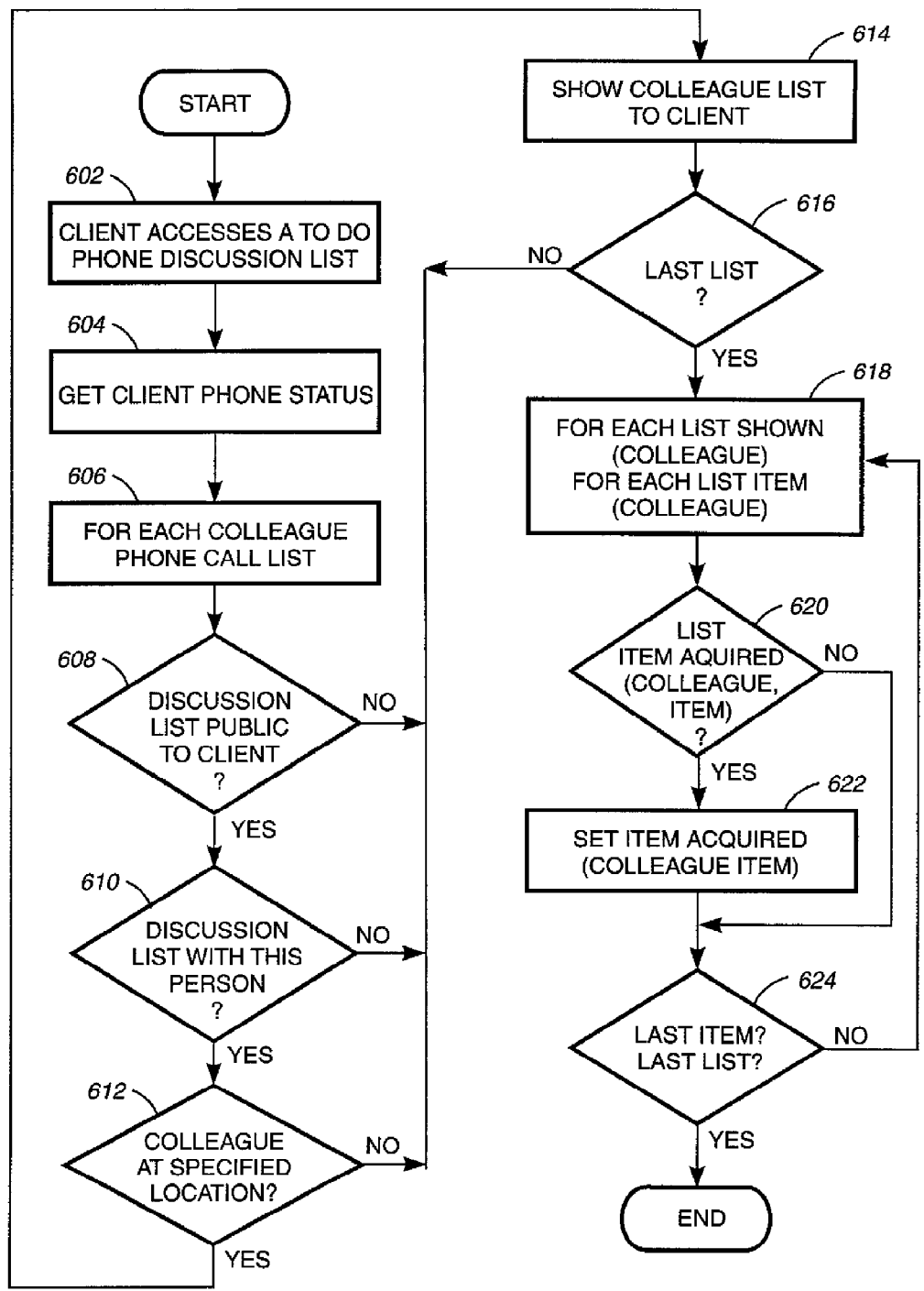
FIG. 6 comprises a flowchart illustrating the steps of the Active Calendar System as applied to a telephonic meeting discussion list.

FIG. 6 comprises a flowchart illustrating the steps of the Active Calendar system as applied to a telephonic meeting discussion list. Consider, for example a "To Do List" object such as a "Telephone Conference List" which is accessed by a user (602). One can designate that such an object can be public to a select group of other users. This group can be context sensitive. For instance, an "Telephone Conference" list may be public to others in a user's work group whereas a "Executive Video Conference List" may be public only to members of the Board of Directors.

Using some appropriate middle-ware with location enabled information, the Active Calendar Component (300) determines a user's location (604) and, for example, the location of a users office. This location may refer to a physical location, an electronic location, a symbolic location, a URL, an ID or identification, an account, a telephone number or the equivalent. If the user is at the Telephone Conference and accesses his/her "Telephone Conference List", the system checks for other public objects of type "Telephone Conference List" owned by the user's peers or colleagues (606) whose office location is close to the users office location. Then the system determines if such lists exist which are public to a user (608), at the same location as the user location (610) and optionally if the peers are at a specified location (612). This location may refer to a physical location, an electronic location, a symbolic location, a URL, an ID or identification, an account, a telephone number or the equivalent. As a result, the system can either display their Telephonic Discussion list on a portable, location aware, connected device, or display an icon indicating it has discovered one or more peer list(s) (614). Next, a determination is made (616) as to whether or not this is the last list available for the particular location and Telephone Conference list type. If it is not the last list, then the process loops to step (606). Otherwise, the process enters a loop so that for each list and item shown (618) a user may then choose (620) to either select the icon and picks up or inquires about the discussion items needed by his/her peer (622) or to disregard the peer's needs by bypassing the selection step. Finally, a determination is made as to whether or not a the previous item was the last item on the last list (624). If not the process continues with step (618). If so, then the process terminates. When a user picks up an item or learns the answer to a question in a discussion, that fact can be entered into the Telephone Conference list database so that the peer or colleague knows that the items have been acquired and by whom.

Another Embodiment

Cooperative Management of Stock Portfolio

Figure 8:
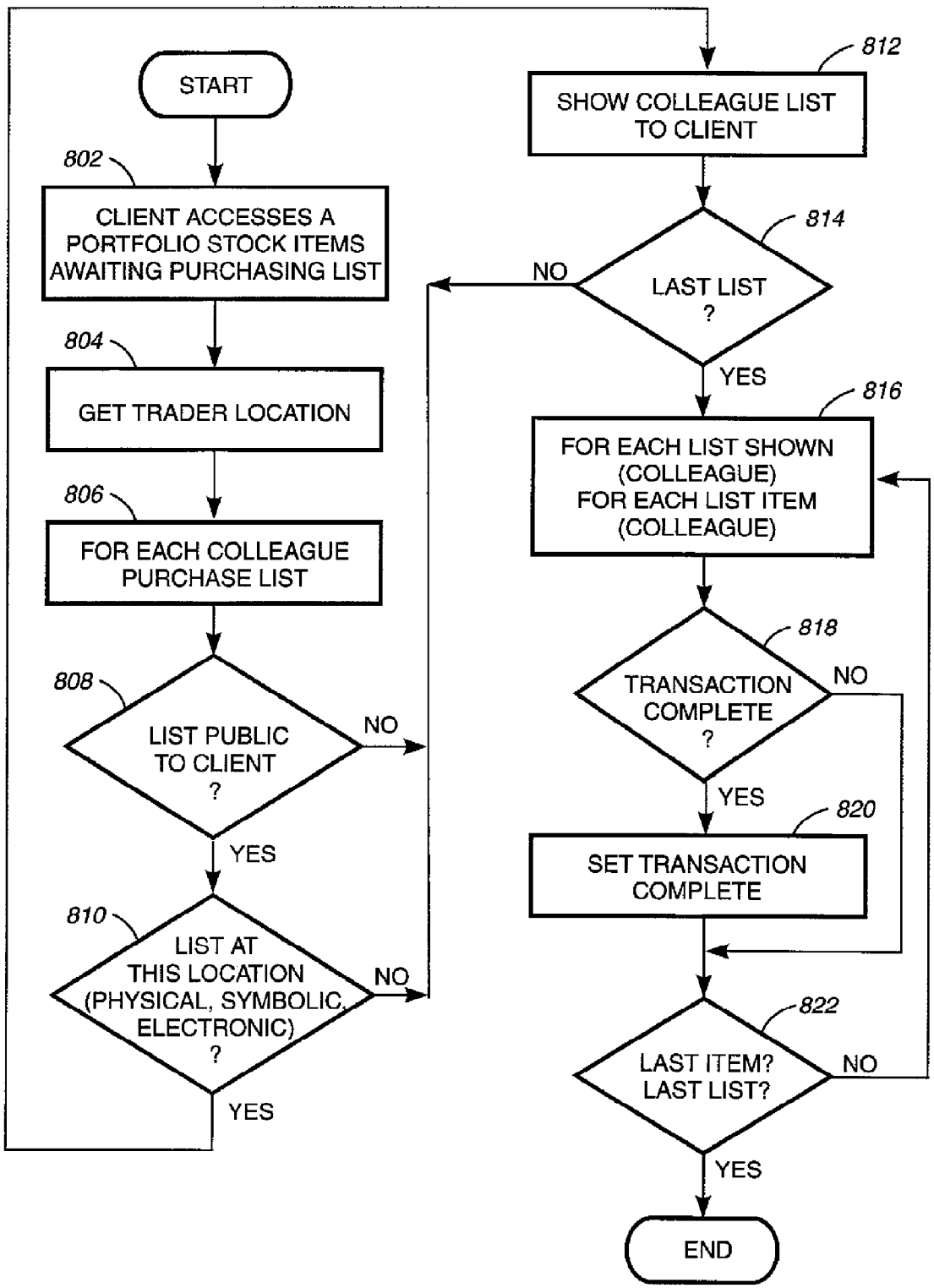
FIG. 8 comprises a flowchart illustrating the steps of the Active Calendar System as applied to a portfolio stock items awaiting purchase list.

Another embodiment comprises a stock portfolio manager deciding, for example, to purchase 100,000 shares of IBM to add to his portfolio. The manager accesses his or her "Portfolio Stock Items Awaiting Purchase List". He or she calls his trader on the floor to order the transaction. The system notifies the portfolio manager that his peer also wants to purchase IBM Stock (250,000 shares). The manager then informs the trader electronically of both transactions thereby causing the transaction to be processed by the trader. The trader informs the portfolio manager who marks both transactions as being complete. FIG. 8 illustrates the functional aspects of the invention as applied to stock transactions.

FIG. 8 comprises a flowchart (800) illustrating the steps of the Active Calendar system as applied to a "Portfolio Stock Items Awaiting Purchase List". Consider, for example a "Portfolio Stock Items Awaiting Purchase List" which is accessed by a portfolio manager (802). One can designate that such an object can be public to a select group of other users. This group can be context sensitive. For instance, an "Portfolio Stock Items Awaiting Purchase List" list may be public to others in a user's work group whereas a "Fund Managers List" may be public only to members of the fund management.

Using some appropriate middle-ware with location enabled information, the Active Calendar Component (300) determines a trader's location (804). This location may refer to a physical location, an electronic location, a symbolic location, a URL, an ID or identification, an account, a telephone number or the equivalent. If the portfolio manager accesses his/her "Portfolio Stock Items Awaiting Purchase List", the system checks for other public objects of type "Portfolio Stock Items Awaiting Purchase List" owned by the user's peers or colleagues (806). Then the system determines if such lists exist which are public to a portfolio manager (808) and at the same location as the trader's location (810). This location may refer to a physical location, an electronic location, a symbolic location, a URL, an ID or identification, an account, a telephone number or the equivalent. As a result, the system can either display their "Portfolio Stock Items Awaiting Purchase List" on a portable, location aware, connected device, or display an icon indicating it has discovered one or more peer list(s) (812). Next, a determination is made (814) as to whether or not this is the last list available for the particular location and "Portfolio Stock Items Awaiting Purchase List" type. If it is not the last list, then the process loops to step (806). Otherwise, the process enters a loop so that for each list and item shown (816) a portfolio manager may then choose (818) to either select the icon and order the transaction needed by his/her peer to be completed (820) or to disregard the peer's needs by bypassing the selection step. Finally, a determination is made as to whether or not the previous item was the last item on the last list (822). If not the process continues with step (816). If so, then the process terminates. When a portfolio manager purchases a colleagues stocks, that fact can be entered into the "Portfolio Stock Items Awaiting Purchase List" database so that the peer or colleague knows that the items have been acquired and by whom.

Another Embodiment

Cooperative Inventory Control

Figure 9:
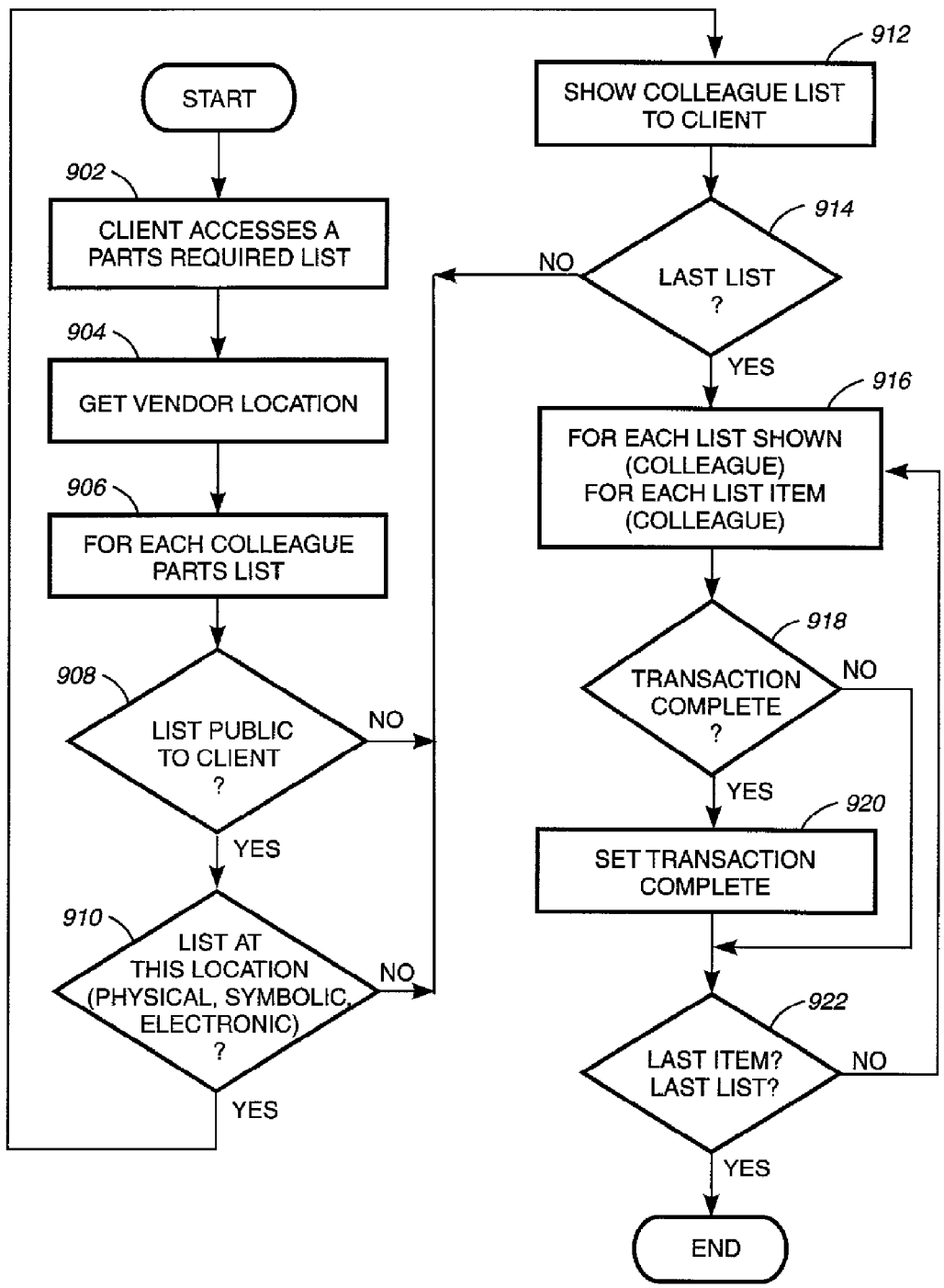
FIG. 9 comprises a flowchart illustrating the steps of the Active Calendar System as applied to a parts required list.

Another embodiment comprises a manufacturing manager responsible for workstation assembly needing to order 10,000 disk drives from IBM for his next production run. He or she accesses his "Parts Required List" to get the IBM part number and purchase information. The system notifies him or her that the production manager in charge of displays also needs to order 9,000 flat panel displays from IBM and sends him or her the department charge numbers for the display assembly line. The manufacturing manager orders both sets of parts electronically from IBM in one transaction saving the time of the other production manager. FIG. 9 illustrates the functional aspects of the invention as applied to inventory control.

FIG. 9 comprises a flowchart (900) illustrating the steps of the Active Calendar system as applied to a "Parts Required List". Consider, for example a "Parts Required List" which is accessed by a manufacturing manager (902). One can designate that such an object can be public to a select group of other users. This group can be context sensitive. For instance, an "Parts Required List" may be public to others in a user's work group whereas a "Advanced Technology List" may be public only to members of a research team.

Using some appropriate middle-ware with location enabled information, the Active Calendar Component (300) determines a vendor's location (904). This location may refer to a physical location, an electronic location, a symbolic location, a URL, an ID or identification, an account, a telephone number or the equivalent. If the manufacturing manager accesses his/her "Parts Required List", the system checks for other public objects of type "Parts Required List" owned by the manufacturing manager's peers or colleagues (906). Then the system determines if such lists exist which are public to a manufacturing manager (908) and at the same location as the vendor's location (910). This location may refer to a physical location, an electronic location, a symbolic location, a URL, an ID or identification, an account, a telephone number or the equivalent. As a result, the system can either display their "Parts Required List" on a portable, location aware, connected device, or display an icon indicating it has discovered one or more peer list(s) (912). Next, a determination is made (914) as to whether or not this is the last list available for the particular location and "Parts Required List" type. If it is not the last list, then the process loops to step (906). Otherwise, the process enters a loop so that for each list and item shown (916) a manufacturing manager may then choose (918) to either select the icon or order the transaction needed by his/her peer to be completed (920) or to disregard the peer's needs by bypassing the selection step. Finally, a determination is made as to whether or not the previous item was the last item on the last list (922). If not the process continues with step (916). If so, then the process terminates. When a manufacturing manager purchases a colleague's items, that fact can be entered into the "Parts Required List" database so that the peer or colleague knows that the items have been acquired and by whom.

Another Embodiment

Cooperative Currency Trading

Figure 10:
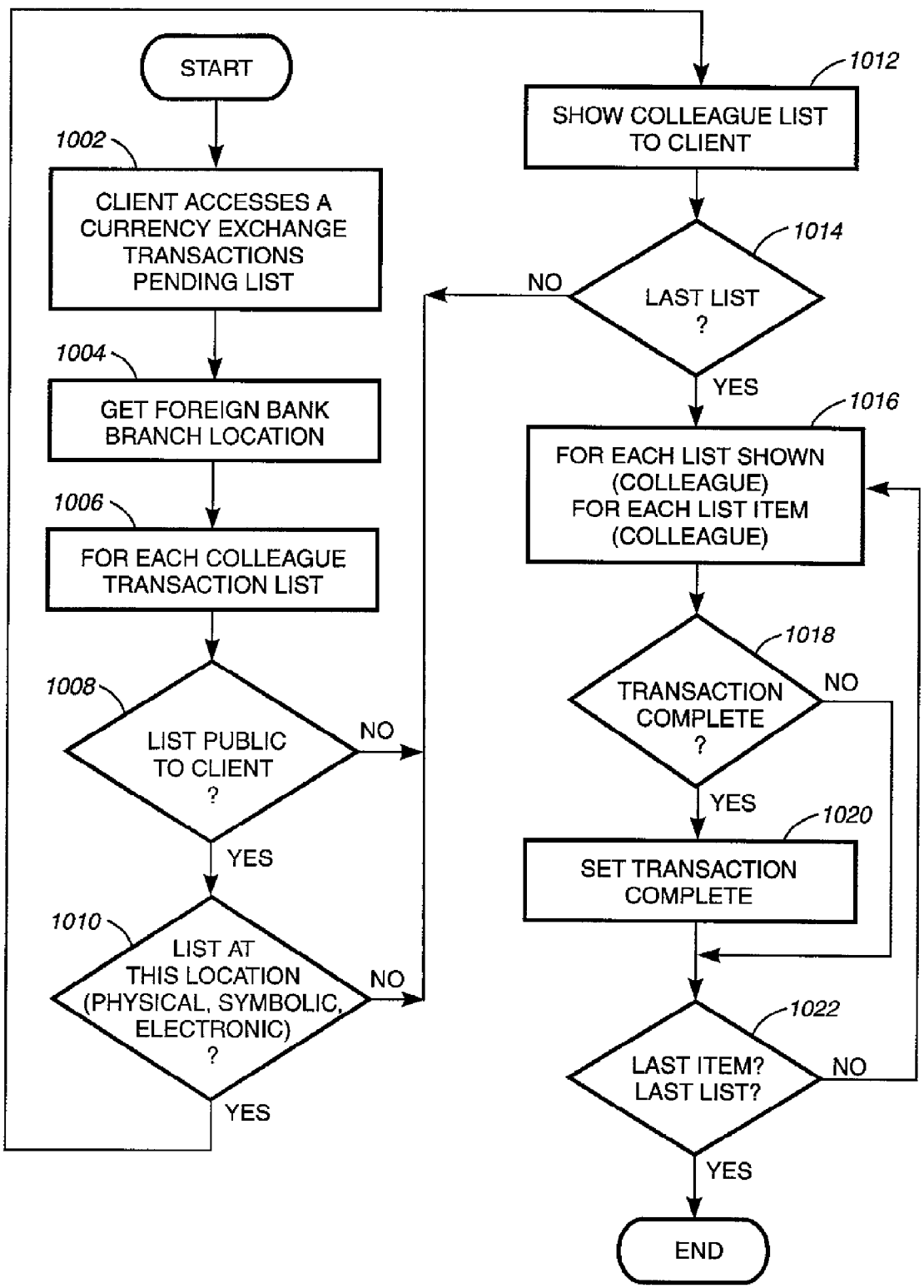
FIG. 10 comprises a flowchart illustrating the steps of the Active Calendar System as applied to a currency exchange transaction pending list.

Another embodiment comprises a bank customer calling a bank branch office and asking the branch manager to exchange $50,000 in U.S. currency from her checking account into Japanese Yen. The branch manager does not have the required amount of yen on hand so he or she contacts the bank's Japanese office to make an exchange at a more favorable rate. In so doing, he or she activates his "Currency Exchange Transactions Pending List". The system informs him or her that a teller at a different branch of the same bank also needs to exchange US$ for yen. He or she is able to place both currency exchange transactions in one e-mail or electronic transaction with the Japanese branch office. Thus, achieving a savings in a per transaction fee as well as the time of the teller at the other local branch. FIG. 10 describes the processing of the aforementioned bank transaction.

FIG. 10 comprises a flowchart illustrating the steps of the Active Calendar system as applied to a "Currency Exchange Transactions Pending List". Consider, for example a "Currency Exchange Transactions Pending List" which is accessed by a branch manager (1002). One can designate that such an object can be public to a select group of other users. This group can be context sensitive. For instance, an "Currency Exchange Transactions Pending List" may be public to others in a user's work group whereas a "Financial Instruments List" may be public only to members of the bank management.

Using some appropriate middle-ware with location enabled information, the Active Calendar Component (300) determines a foreign bank branch location (1004). This location may refer to a physical location, an electronic location, a symbolic location, a URL, an ID or identification, an account, a telephone number or the equivalent. If the branch manager accesses his/her "Currency Exchange Transactions Pending List", the system checks for other public objects of type "Currency Exchange Transactions Pending List" owned by the user's peers or colleagues (1006). Then the system determines if such lists exist which are public to a branch manager (1008) and at the same location as the foreign bank branch's location (1010). This location may refer to a physical location, an electronic location, a symbolic location, a URL, an ID or identification, an account, a telephone number or the equivalent. As a result, the system can either display their "Currency Exchange Transactions Pending List" on a portable, location aware, connected device, or display an icon indicating it has discovered one or more peer list(s) (1012). Next, a determination is made (1014) as to whether or not this is the last list available for the particular location and "Currency Exchange Transactions Pending List" type. If it is not the last list, then the process loops to step (1006). Otherwise, the process enters a loop so that for each list and item shown (1016) a branch manager may then choose (1018) to either select the icon and order the transaction needed by his/her peer to be completed (1020) or to disregard the peer's needs by bypassing the selection step. Finally, a determination is made as to whether or not the previous item was the last item on the last list (1022). If not the process continues with step (1016). If so, then the process terminates. When a branch manager converts a colleague's currency, that fact can be entered into the "Currency Exchange Transactions Pending List" database so that the peer or colleague knows that the items have been acquired and by whom.

Conclusion

Therefore, a more efficient method and system has been described that reduces costs by allowing for collaborative efforts in an organization. This reduces redundancy in effort and reduces a concomitant loss in worker efficiency. Also, the sharing of knowledge about coworkers' needs enables an individual within the organization to meet the needs of a peer or colleague without any centralized control.

Discussion of Hardware and Software Implementation Options

The present invention, as would be known to one of ordinary skill in the art could be produced in hardware or software, or in a combination of hardware and software. The system, or method, according to the inventive principles as disclosed in connection with the preferred embodiment, may be produced in a single computer system having separate elements or means for performing the individual functions or steps described or claimed or one or more elements or means combining the performance of any of the functions or steps disclosed or claimed, or may be arranged in a distributed computer system, interconnected by any suitable means as would be known by one of ordinary skill in art.

According to the inventive principles as disclosed in connection with the preferred embodiment, the invention and the inventive principles are not limited to any particular kind of computer system but may be used with any general purpose computer, as would be known to one of ordinary skill in the art, arranged to perform the functions described and the method steps described. The operations of such a computer, as described above, may be according to a computer program contained on a medium for use in the operation or control of the computer, as would be known to one of ordinary skill in the art. The computer medium which may be used to hold or contain the computer program product, may be a fixture of the computer such as an embedded memory or may be on a transportable medium such as a disk, as would be known to one of ordinary skill in the art.

The invention is not limited to any particular computer program or logic or language, or instruction but may be practiced with any such suitable program, logic or language, or instructions as would be known to one of ordinary skill in the art. Without limiting the principles of the disclosed invention any such computing system can include, inter alia, at least a computer readable medium allowing a computer to read data, instructions, messages or message packets, and other computer readable information from the computer readable medium. The computer readable medium may include non-volatile memory, such as ROM, Flash memory, floppy disk, Disk drive memory, CD-ROM, and other permanent storage. Additionally, a computer readable medium may include, for example, volatile storage such as RAM, buffers, cache memory, and network circuits.

Furthermore, the computer readable medium may include computer readable information in a transitory state medium such as a network link and/or a network interface, including a wired network or a wireless network, that allow a computer to read such computer readable information.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A computer readable storage medium for controlling a client wireless component for providing location dependent information to a user for selective colleague assistance, a computer readable medium comprising instructions for:
   receiving location data from a location tracking device;
   transmitting the location data to a server associated with location dependent data structures; and
   receiving automatically server generated location dependent data transmitted from the server to a subset of a group associated with a first colleague item list in response to a user of a client wireless component being a member of the group associated with a first colleague item list and the client wireless component being within a threshold distance to at least one of an event location and an object specified in the first colleague item list, wherein each member of the group associated with the first colleague item list has added at least one item to the first colleague item list and has associated with at least one item in the first colleague item list that has been added by another member of the group associated with the first colleague item list; and receiving, within the threshold distance to the at least one of an event location and an object specified in the first colleague item list, automatically server generated location dependent data transmitted from the server to a subset of a group associated with a second colleague item list in response to the user of the client wireless component being a member of the group associated with the second colleague item list and the client wireless component being within a threshold distance to at least one of an event location and an object specified in the second colleague item list and wherein a list of members of the first colleague item list is different from a list of members of the second colleague item list, wherein each member of the group associated with the second colleague item list has added at least one item to the second colleague item list and has associated with at least one item in the second colleague item list that has been added by another member of the group associated with the second colleague item list, and further in response to at least one other member of the subset of the group currently being located within a given distance from a location associated with the user of the client wireless component.

2. A server associated with providing location dependent information to a user, the server comprising:

a network interface hardware for receiving geographic location data from a client wireless component; and a session manager for determining if a set of at least two lists exists for user completion comprising a first item list and a second item list, wherein a first member of a first group associated with the first list adds at least one item to the first list, wherein a second member of a second group associated with the second list adds at least one item to the second list, and in response to the client wireless component being within a threshold distance of a location of an item in the first list then determining if the user of the client wireless component, who is different from the first member and the second member, is a member of the first group associated with the first item list, and in response to the user being a member of the first group associated with the first item list, then transmitting an automatically server generated location dependent task specified in the first item list from the server to the client wireless component; and determining if the user of the client wireless component is a member of the second group associated with the second item list, and in response to the user being a member of the second group associated with the second item list, the client wireless component being within a threshold distance of a location of an item in the second list, and at least one other member of the second group currently being located within a given distance from a location associated with the user of the client wireless component, then transmitting an automatically server generated location dependent task specified in the second item list to the client wireless component.

3. The server of claim 2, further comprising:

a list of members of the second item list being different from a list of members of the first item list that has been added by another member of the group associated with the first item list.

4. The server of claim 2, wherein a membership in the group includes destination data selected from a group of destination data consisting of: an office location, a home address, and a business address.

5. A non-transitory computer readable storage medium for controlling a server associated with providing location dependent information to a user, the computer readable storage medium comprising instructions for:

receiving geographic location data from a client wireless component; and determining if a set of at least two lists exists for user completion comprising a first item list and a second item list, wherein a first member of a first group associated with the first list adds at least one item to the first list, wherein a second member of a second group associated with the second list adds at least one item to the second list, and in response to the client wireless component being within a threshold distance of a location of an item in the first list then determining if the user of the client wireless component, who is different from the first member and the second member, is a member of the first group associated with the first item list, and in response to the user being a member of the first group associated with the first item list, then transmitting an automatically server generated location dependent task specified in the first item list from the server to the client wireless component; and determining if the user of the client wireless component is a member of the second group associated with the second item list, and in response to the user being a member of the second group associated with the second item list, the client wireless component being within a threshold distance of a location of an item in the second list, and at least one other member of the second group currently being located within a given distance from a location associated with the user of the client wireless component, then transmitting an automatically server generated location dependent task specified in the second item list to the client wireless component.

6. The computer readable storage medium of claim 5, further comprising:

a list of members of the second item list being different from a list of members of the first item list that has been added by another member of the group associated with the first item list.

7. The computer readable storage medium of claim 5, wherein a membership in the group includes destination data selected from a group of destination data consisting of: an office location, a home address, and a business address.

8. A client wireless device for providing location dependent information to a user for selective colleague assistance, the client wireless device comprising:

a location tracking device including an antenna and interface for receiving geographic location data therefrom;

a transceiver for transmitting the geographic location data to a server associated with location dependent data structures; and a processor for receiving automatically server generated location dependent data transmitted from the server to a subset of a group associated with at least two lists for user completion comprising a first item list and a second item list, wherein a first member of a first group associated with the first list adds at least one item to the first list, wherein a second member of a second group associated with the second list adds at least one item to the second list, and in response to the client wireless device being within a threshold distance of a location of an item in the first list then determining if the user of the client wireless device, who is different from the first member and the second member, is a member of the first group associated with the first item list, and in response to the user being a member of the first group associated with the first item list, then transmitting an automatically server generated location dependent task specified in the first item list from the server to the client wireless device; and determining if the user of the client wireless device is a member of the second group associated with the second item list, and in response to the user being a member of the second group associated with the second item list, the client wireless device being within a threshold distance of a location of an item in the second list, and at least one other member of the second group currently being located within a given distance from a location associated with the user of the client wireless device, then transmitting an automatically server generated location dependent task specified in the second item list to the client wireless device.

9. The client wireless device as defined in claim 8, further comprising:

an input and output device for inputting user commands and displaying system status and user commands;

a graphical user interface for interfacing with the input and output device; and wherein the location tracking device includes receiving destination data selected from a group of destination data consisting of: an office location, a home address, and a business address.

10. The client wireless device as defined in claim 8, wherein the location tracking device receives data from at least one of a nearest cell location tracking, a triangulation cell location tracking, a Global Positioning System (GPS) tracking, a Radio Frequency Badge Tracking, and a generic location tracking system.

11. A non-transitory computer readable storage medium for controlling a client wireless device associated with location dependent data structures for providing location dependent information to a user, the computer readable storage medium comprising instructions for:

receiving geographic location data therefrom;

a transceiver for transmitting the geographic location data to a server associated with location dependent data structures; and a processor for receiving automatically server generated location dependent data transmitted from the server to a subset of a group associated with at least two lists for user completion comprising a first item list and a second item list, wherein a first member of a first group associated with the first list adds at least one item to the first list, wherein a second member of a second group associated with the second list adds at least one item to the second list, and in response to the client wireless device being within a threshold distance of a location of an item in the first list then determining if the user of the client wireless device, who is different from the first member and the second member, is a member of the first group associated with the first item list, and in response to the user being a member of the first group associated with the first item list, then transmitting an automatically server generated location dependent task specified in the first item list from the server to the client wireless device; and determining if the user of the client wireless device is a member of the second group associated with the second item list, and in response to the user being a member of the second group associated with the second item list, the client wireless device being within a threshold distance of a location of an item in the second list, and at least one other member of the second group currently being located within a given distance from a location associated with the user of the client wireless device, then transmitting an automatically server generated location dependent task specified in the second item list to the client wireless device.

12. The computer readable storage medium of claim 11, further comprising: an input and output device for inputting user commands and displaying system status and user commands;

a graphical user interface for interfacing with the input and output device; and wherein the location tracking device includes receiving destination data selected from a group of destination data consisting of: an office location, a home address, and a business address.

13. The computer readable storage medium of claim 11, wherein the location tracking device includes receiving data from at least one of a nearest cell location tracking, a triangulation cell location tracking, a Global Positioning System (GPS) tracking, a Radio Frequency Badge Tracking, and a generic location tracking system.

* * * * *